US007814376B2

(12) United States Patent
Bhardwaj

(10) Patent No.: US 7,814,376 B2
(45) Date of Patent: Oct. 12, 2010

(54) METHOD AND APPARATUS FOR FRAME DELINEATION

(75) Inventor: Sanjay Bhardwaj, Fremont, CA (US)

(73) Assignee: Exar Corporation, Fremont, CA (US)

( * ) Notice: Subject to any disclaimer, the term of this patent is extended or adjusted under 35 U.S.C. 154(b) by 837 days.

(21) Appl. No.: 10/790,981

(22) Filed: Mar. 1, 2004

(65) Prior Publication Data

US 2005/0190742 A1    Sep. 1, 2005

(51) Int. Cl.
  *G06F 11/00* (2006.01)
(52) U.S. Cl. ......................... 714/707; 714/776
(58) Field of Classification Search ................. 714/707, 714/776
  See application file for complete search history.

(56) References Cited

U.S. PATENT DOCUMENTS

| 5,005,191 | A | * | 4/1991 | O'Connor et al. ........... 375/368 |
| 5,056,119 | A | * | 10/1991 | Sakalian et al. ............. 375/354 |
| 5,081,654 | A | * | 1/1992 | Stephenson et al. ......... 375/368 |
| 5,483,539 | A | * | 1/1996 | Kaufmann ................... 370/509 |
| 5,508,985 | A | * | 4/1996 | Fairchild et al. ......... 369/47.22 |
| 5,920,572 | A | * | 7/1999 | Washington et al. ........ 370/535 |
| 6,047,004 | A | * | 4/2000 | Koyama ...................... 370/509 |
| 6,085,336 | A | * | 7/2000 | Swoboda et al. .............. 714/30 |
| 6,539,051 | B1 | * | 3/2003 | Grivna ........................ 375/219 |
| 6,594,327 | B1 | | 7/2003 | Radi |
| 6,819,679 | B1 | * | 11/2004 | Kerns et al. .................. 370/474 |
| 7,020,729 | B2 | * | 3/2006 | Taborek et al. .............. 710/305 |
| 7,103,049 | B2 | * | 9/2006 | Wright et al. ............ 370/395.1 |
| 7,151,773 | B1 | * | 12/2006 | Mo et al. ..................... 370/392 |
| 2003/0161351 | A1 | | 8/2003 | Beverly et al. |

OTHER PUBLICATIONS

10GE WAN PHY Overview (or UniPHY WIS), IEEE 802.3ae Meeting Ottawa, May 23-May 25, 2000, vol. 1.
64b/66b PCS Coding Update, Jul. 10-14, 2000—La Jolla, CA (IEEE 802.3ae Task Force).
Introduction to 10 Gigabit 64b/66b (Clause 49)—Sowmya S. Lauckoor, Oct. 22, 2001.

* cited by examiner

*Primary Examiner*—Scott T Baderman
*Assistant Examiner*—Enam Ahmed
(74) *Attorney, Agent, or Firm*—Townsend and Townsend and Crew LLP

(57) ABSTRACT

A frame delineation mechanism which alternately considers even and odd sync pattern position possibilities. With the addition of toggle logic, each of 66 possible states of even and odd alignment are exhausted in turn, odd, followed by even, followed by odd and so on, providing synchronization more quickly than known mechanisms. Additionally, faster convergence is reached due to the use of an exhaust register which keeps track of those alignment states that were tested but did not provide synchronization. Until synchronization is acquired, the states indicated in the exhaust register are ignored in further attempts to acquire synchronization.

13 Claims, 4 Drawing Sheets

PRIOR ART

FIG. 2

| EVEN STATES | State Number | ODD STATES |
|---|---|---|
| ← 128 bits → | | ← 128 bits → |
| ss [64] ss [60] | 1 | s [64] ss [61] |
| [4] ss [64] ss [56] | 2 | [3] ss [64] ss [57] |
| [8] ss [64] ss [52] | 3 | [7] ss [64] ss [53] |
| [12] ss [64] ss [48] | 4 | [11] ss [64] ss [49] |
| [16] ss [64] ss [44] | 5 | [15] ss [64] ss [45] |
| [20] ss [64] ss [40] | 6 | [19] ss [64] ss [41] |
| [24] ss [64] ss [36] | 7 | [23] ss [64] ss [37] |
| [28] ss [64] ss [32] | 8 | [27] ss [64] ss [33] |
| [32] ss [64] ss [28] | 9 | [31] ss [64] ss [29] |
| [36] ss [64] ss [24] | 10 | [35] ss [64] ss [25] |
| [40] ss [64] ss [20] | 11 | [39] ss [64] ss [21] |
| [44] ss [64] ss [16] | 12 | [43] ss [64] ss [17] |
| [48] ss [64] ss [12] | 13 | [47] ss [64] ss [13] |
| [52] ss [64] ss [8] | 14 | [51] ss [64] ss [9] |
| [56] ss [64] ss [4] | 15 | [55] ss [64] ss [5] |
| [60] ss [64] ss | 16 | [59] ss [64] ss [1] |
| [64] ss [62] | 17 | [63] ss [63] |
| [2] ss [64] ss [58] | 18 | [1] ss [64] ss [59] |
| [6] ss [64] ss [54] | 19 | [5] ss [64] ss [55] |
| [10] ss [64] ss [50] | 20 | [9] ss [64] ss [51] |
| [14] ss [64] ss [46] | 21 | [13] ss [64] ss [47] |
| [18] ss [64] ss [42] | 22 | [17] ss [64] ss [43] |
| [22] ss [64] ss [38] | 23 | [21] ss [64] ss [39] |
| [26] ss [64] ss [34] | 24 | [25] ss [64] ss [35] |
| [30] ss [64] ss [30] | 25 | [29] ss [64] ss [31] |
| [34] ss [64] ss [26] | 26 | [33] ss [64] ss [27] |
| [38] ss [64] ss [22] | 27 | [37] ss [64] ss [23] |
| [42] ss [64] ss [18] | 28 | [41] ss [64] ss [19] |
| [46] ss [64] ss [14] | 29 | [45] ss [64] ss [15] |
| [50] ss [64] ss [10] | 30 | [49] ss [64] ss [11] |
| [54] ss [64] ss [6] | 31 | [53] ss [64] ss [7] |
| [58] ss [64] ss [2] | 32 | [57] ss [64] ss [3] |
| [62] ss [64] | 33 | [61] ss [64] s |

| State No. | State | Rotate amt | Reg 314 | Sent/Not Sent |
| --- | --- | --- | --- | --- |
| 1 | ss64ss60 | 0 | Idle Cycle | Not Sent |
| 2 | 4ss64ss56 | 4 | ss64ss60,4 | yes |
| 3 | 8ss64ss52 | 8 | ss64ss56,8 | yes |
| 4 | 12ss64ss48 | 12 | ss64ss52,12 | yes |
| 5 | 16ss64ss44 | 16 | ss64ss48,16 | yes |
| 6 | 20ss64ss40 | 20 | ss64ss44,20 | yes |
| 7 | 24ss64ss36 | 24 | ss64ss40,24 | yes |
| 8 | 28ss64ss32 | 28 | ss64ss36,28 | yes |
| 9 | 32ss64ss28 | 32 | ss64ss32,32 | yes |
| 10 | 36ss64ss24 | 36 | ss64ss28,36 | yes |
| 11 | 40ss64ss20 | 40 | ss64ss24,40 | yes |
| 12 | 44ss64ss16 | 44 | ss64ss20,44 | yes |
| 13 | 48ss64ss12 | 48 | ss64ss16,48 | yes |
| 14 | 52ss64ss8 | 52 | ss64ss12,52 | yes |
| 15 | 56ss64ss4 | 56 | ss64ss8,56 | yes |
| 16 | 60ss64ss | 60 | ss64ss4,60 | yes |
| 17 | 64ss62 | 64 | ss64ss64 | yes |
| 18 | 2ss64ss58 | 68 | ss62,2ss64 | yes |
| 19 | 6ss64ss54 | 72 | ss58,6ss64 | yes |
| 20 | 10ss64ss50 | 76 | ss54,10ss64 | yes |
| 21 | 14ss64ss46 | 80 | ss50,14ss64 | yes |
| 22 | 18ss64ss42 | 84 | ss46,18ss64 | yes |
| 23 | 22ss64ss38 | 88 | ss42,22ss64 | yes |
| 24 | 26ss64ss34 | 92 | ss38,26ss64 | yes |
| 25 | 30ss64ss30 | 96 | ss34,30ss64 | yes |
| 26 | 34ss64ss26 | 100 | ss30,34ss64 | yes |
| 27 | 38ss64ss22 | 104 | ss26,38ss64 | yes |
| 28 | 42ss64ss18 | 108 | ss22,42ss64 | yes |
| 29 | 46ss64ss14 | 112 | ss18,46ss64 | yes |
| 30 | 50ss64ss10 | 116 | ss14,50ss64 | yes |
| 31 | 54ss64ss6 | 120 | ss10,54ss64 | yes |
| 32 | 58ss64ss2 | 124 | ss6,58ss64 | yes |
| 33 | 62ss64 | 128 | ss2,62ss64 | yes |

FIG. 4

METHOD AND APPARATUS FOR FRAME DELINEATION

FIELD OF THE INVENTION

The present invention relates generally to data communications, and more particularly to delineating the frame boundaries of framed data that is in a serial format.

BACKGROUND INFORMATION

In data communications, data is typically organized in structures such as packets which include multiple bits of data arranged in a predefined format. In transmission, it is common for data to be serialized and transmitted over a medium for reception at a remotely located receiver. At the receiver, in order to properly interpret the received data, it is necessary to reconstruct the received data in its original structure; e.g., if the data was originally organized in packets, it is necessary to delineate the original packet boundaries from the serialized data.

Frame delineation or alignment typically refers to a process or mechanism at the receive side of the network medium interface which realigns serially transmitted data into a known format and alignment for subsequent packet/frame or cell processing.

In some data communications systems, the individual bits of serialized data are recovered at the receiver using a clock derived from the serial data stream itself. Since the clock derived is dependent only on the "0" and "1" bit transitions, the recovered traffic need not be aligned to any position on the data path. Additional, synchronization information must be inserted into the serial data stream at the transmitter in order to mark or delineate packet or frame boundaries.

When performing packet or frame delineation, the probability that the synchronization information (e.g., "sync" bits, bytes, words) will be at an odd location with respect to the data path is the same as the probability that it will be at an even location. Due to the randomness of traffic from the network, a known approach has been to iteratively take a best guess at the position of the synchronization information and to prove or disprove the guess through repetitive checks. Prior art algorithms tend to stay on the odd or on the even guesses until all possibilities are exhausted. This approach may cause the acquisition time to be unnecessarily long.

In data communications, packet delineation functions are carried out by the Physical Coding Sub-layer (PCS). Components of this layer reside in both the transmitting and receiving ends of a communication. The PCS codes the data on transmission so that the alignment is recoverable on reception. At the transmitter, the PCS adds to each packet, at a fixed location within each packet, a pattern which the receiver looks for at reception.

In 10 Gb Ethernet for example, defined by IEEE Standard 802.3ae, the PCS packet delineation algorithm is referred to as "66b/64b ." In accordance with this algorithm, a two-bit sync pattern (or "sync header") is inserted after every 64 bits of data. As such, for every 64 bits of data, 66 bits are transmitted. The 64b/66b algorithm replaces the 10b/8b algorithm used for Gigabit Ethernet (and below). This change was primarily motivated by the fact that a 25% overhead for this function was too costly at 10 Gb speeds which meant a loss of 2.5 Gb of bandwidth.

The implementation of a PCS algorithm involves a systematic transition among a synchronized state, an unsynchronized state, and a so-called "slip" state. The synchronized state is said to have been attained when a predetermined number of consecutive frames (e.g., 64) have been received correctly (i.e., with proper frame alignment). Synchronization is lost and the unsynchronized state is said to have been entered if a predetermined proportion of frames (e.g. 16 out of 64) are not received with proper frame alignment or the bit error rate (BER) exceeds a predetermined threshold. Once that occurs, the PCS algorithm will enter the slip state in which it attempts to acquire synchronization.

The duration of the slip state, which is indicative of the performance of the PCS algorithm, is typically sensitive to several considerations. A first consideration is the bias that the algorithm has as to whether the sync headers occur at even or odd positions (relative to some initial reference) within the serial data stream. An algorithm with an even bias will exhaust all of the even possibilities before considering any odd possibilities, whereas an algorithm with an odd bias will exhaust all of the odd possibilities before considering any even possibilities.

A second consideration is whether the algorithm looks for the sync header pattern only at a fixed position in the serial bit stream or whether it is capable of varying the position along the bit stream at which it will look for the sync header pattern. The former approach, which is typical of known implementations, further delays the acquisition of synchronization. This is because unless a hit occurs with the aligned position at the right time, several false sync positions may be taken, based on the pattern of data, until proven to be incorrect.

The present invention avoids the above discussed limitations of the prior art which contribute to delays in acquiring synchronization.

SUMMARY OF THE INVENTION

The present invention provides apparatus and methods for performing frame alignment (or synchronization) on serialized data. In an exemplary embodiment adapted to the 64b/66b scheme of 10 Gb Ethernet, the present invention provides a mechanism for acquiring frame synchronization substantially faster than known approaches. Unlike known algorithms which tend to stay on the odd or on the even possibilities until all possibilities are exhausted, the present invention alternates between the odd as well as even possibilities, increasing the likelihood of a faster acquisition of synchronization. The mechanism of the present invention tests various sync header positions by alternating between even and odd candidate alignments without being biased to first search all odd (even) candidates before searching all even (odd) candidates. This effectively consolidates the 66 possible states to 33, thereby reducing implementation complexity. Moreover, the mechanism of the present invention can search for synchronization headers wherever they may appear in the incoming serial bit stream, without needing to wait for the headers to occur at a particular position.

In a further aspect of the present invention, synchronization is achieved faster due to the use of an exhaust register which keeps track of candidate alignments which were tested but did not provide synchronization. By avoiding those candidates, the correct alignment can be attained more quickly. Several invalid iterations are thus avoided by steering the mechanism in the right direction.

These and other aspects of the present invention are described below.

BRIEF DESCRIPTION OF THE DRAWINGS

FIG. 2 is a table illustrating the 66 possible states in which a serial data stream can be with respect to a 128-bit wide window.

FIG. 4 is a table illustrating the operation of the system of FIG. 3.

DETAILED DESCRIPTION

Figure 1:
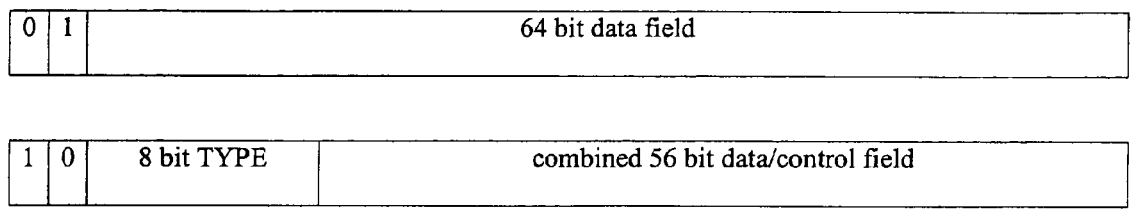
FIG. 1 illustrates the 66b/64b frame structure of 10 Gb Ethernet.

In an exemplary embodiment of the present invention, a frame alignment method and apparatus are provided for 10 Gb Ethernet which uses a 66b/64b scheme, as described above. FIG. 1 shows an exemplary data stream with a 64-bit data field and a two-bit sync header, which may be "01" or "10" depending on the type of data that is involved. Upon transmission of the data stream, the sync header will be repeated every 66 bits, with 64 bits of data in between successive sync headers. The combination of the 64-bit data field and the two-bit sync header is referred to as a "frame."

Even though the exemplary embodiment described is for 10 Gb Ethernet with a 66b/64b scheme, as will be apparent, the present invention is not limited to a particular protocol or scheme.

As the serial data is received, it can be thought of as being shifted bit-wise into a 128-bit wide window whose contents are represented in FIG. 2. The earliest bit is on the left and the latest bit is on the right. The letter "s" represents each sync bit and the bracketed numbers represent the number of data bits between the sync headers. In each state, successive two-bit sync headers are separated by 64 bits of data. (Although a 132-bit window would be better suited to the 66-bit pattern of the 64b/66b scheme, a 128-bit wide window is considered due to other, externally imposed constraints that require processing of data along byte boundaries or in powers of two. For example, a SONET framer may be arranged along the same data path. The exemplary embodiment of the present invention, as described below, is adapted to operate under such constraints.)

The table of FIG. 2 illustrates the 33 states that the 128-bit window successively takes on as the serial data stream is shifted through it. The left column shows those 33 states which occur when the first bit of each sync header falls at an even bit position of the 128-bit window, and will be referred to as the "even" states.

Another set of 33 possible states is illustrated in the right column for the case in which the sync bits are shifted by one bit position relative to those of the left column. When the first bit of each sync header falls at an odd bit position of the 128-bit window, the 128-bit window will successively take on the 33 states shown in the right column, which will be referred to as the "odd" states.

As such, there are a total of 66 possible states in which the 128-bit input shift register can be. The even and odd states in the table of FIG. 2 are numbered 1 through 33. Each odd state is equivalent to the corresponding even state (i.e., the even state of the same number) delayed by one bit position.

Frame alignment is achieved when the receiver has determined the position of the sync bits within the 128-bit window, or in other words, when it has determined which of the 66 states illustrated in FIG. 2 applies. When out of frame alignment, the receiver does not know where the sync bits are within the 128-bit window; i.e., it does not know the correct state. The present invention provides an apparatus and method for determining the correct positions of the sync bits as quickly as possible.

An exemplary embodiment of a synchronization acquisition method in accordance with the present invention entails making a best guess at the current positions of the sync bits within a 128-bit segment of the incoming bit stream (i.e., guessing which state of FIG. 2 applies); determining from said guess the number of bit positions by which the 128-bit segment is to be rotated in order to bring the guessed-at sync bits to predetermined positions (e.g., to bit positions 0, 1 and 66, 67); rotating the 128-bit segment accordingly; testing the guess to determine if it was correct; if incorrect, noting the incorrect guess to avoid re-testing it; shifting the 128-bit segment by one bit; testing the shifted guess; if incorrect, noting the incorrect guess to avoid re-testing it; and repeating said process until synchronization is achieved.

Figure 3:
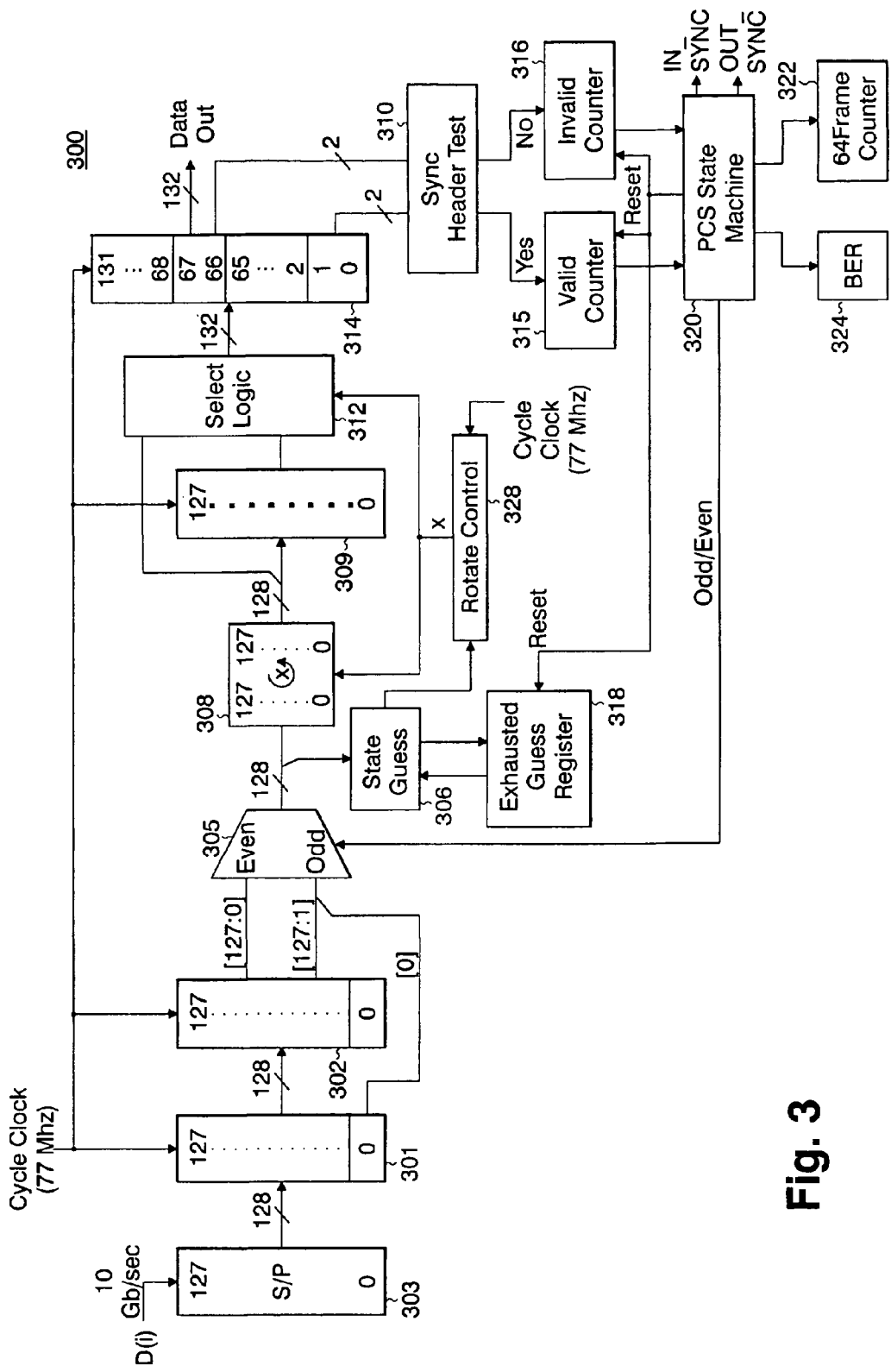
FIG. 3 is a block diagram of an exemplary embodiment of a frame delineation system in accordance with the present invention.

An exemplary embodiment of a synchronization acquisition mechanism in accordance with the present invention will now be described with reference to FIG. 3. FIG. 3 shows a block diagram of an exemplary embodiment of a synchronization acquisition apparatus 300 in accordance with the present invention. The exemplary synchronization acquisition apparatus 300 could be located at a device adapted for receiving 10 Gb Ethernet, which follows the 66b/64b packet delineation scheme discussed above.

In describing the operation of the apparatus of FIG. 3, it is assumed that initially, there is no synchronization; i.e., the apparatus 300 does not know where the synchronization bits are within the serial data stream that is being received and is in an out of sync state. The input serial data stream D(i) is shifted bitwise (at a rate of 10 Gb/sec) into a serial-to-parallel (S/P) converter 303. The S/P converter 303 is 128 bits long (or wide) and can be implemented using a shift register or the like.

The parallel outputs of the S/P converter 303 are coupled to a first register 301 which is also 128 bits wide. For every 128 bits of the input serial data stream D(i) that is shifted into the S/P converter 303, the register 301 is clocked to latch in the outputs of the S/P converter 303. Given a bit rate of 10 Gb/sec, the first register 301 is clocked at a rate of 77 MHz. The period of this clock is also referred to herein as a cycle. As such, 128 bits of the input serial data stream D(i) are shifted into the S/P converter 303 and latched into the first register 301 every cycle.

The first register 301 is coupled to a second register 302, which is also 128 bits wide. During a second cycle, the contents of the first register 301 are latched into the second register 302. As such, the contents of the second register 302 are the same as the contents of the first register 301 one cycle later. In other words, after two cycles, the contents of the second register 302 are D(0)-D(127) and the contents of the first register 301 are D(128)-D(255), where D(0) is the earliest bit of the input serial bit stream.

A multiplexer 305 is coupled to the registers 301 and 302 so that bit 0 of register 301 and bits 1 through 127 of register 302 are coupled to a first set of 128 inputs of the multiplexer (labeled "ODD") and bits 0 through 127 of register 302 are coupled to a second set of 128 inputs of the multiplexer (labeled "EVEN"). Under the control of a selection signal (ODD/EVEN), the multiplexer 305 provides either the 128 ODD inputs or the 128 EVEN inputs to corresponding outputs of the multiplexer. The 128 outputs of the multiplexer 305 are coupled in parallel to a variable rotator 308.

Given the aforementioned contents of the first and second registers after two cycles, when the EVEN inputs of the multiplexer 305 are selected, bits D(0)-D(127) are provided to the variable rotator 308. When the ODD inputs of the multiplexer 305 are selected, bits D(1)-D(128) are provided to the variable rotator 308. This mechanism thereby allows toggling (in accordance with the ODD/EVEN selection signal) between the even and odd states of the same number, as shown in FIG. 2.

The output of the multiplexer 305 is monitored by a state guess block 306. When the system is in the slip state (i.e., when trying to establish synchronization) the state guess block 306 attempts to determine the location of the synchronization bits (01 and 01 or 10 and 10 separated by 64 bits) within the 128 bit data stream segment (i.e., D(0)-D(127)) currently at the output of the multiplexer 305. Stated differently, based on the output of the multiplexer 305, the state guess block 306 attempts to determine which of the 66 possible states illustrated in FIG. 2 is the correct state. Based on the output of multiplexer 305, the state guess block 306 determines a subset of possible states of those in FIG. 2. Through the one bit shift insertable by the above-described toggling mechanism, the right hand column is mapped to the left hand column of FIG. 2.

When generating a guess, the state guess block 306 also considers the contents of an exhausted guess register 318. The exhausted guess register 318 keeps track of those states that have already been used as guesses since losing synchronization. The state guess block 306 further eliminates these states from the subset of possible states. The state guess block 306 then selects one of the subset of states as its guess of the current state of the incoming bit stream.

In an exemplary embodiment, the exhausted guess register 318 may comprise a 66-bit register, with each of the states of FIG. 2 having a corresponding bit. The status of a bit in the exhausted guess register 318 indicates whether the corresponding state has been exhausted as a valid guess. Whenever the state guess block 306 generates a guess, the guessed at state is noted in the exhausted guess register 318 by setting its corresponding bit. The exhausted guess register 318 is cleared upon entry into the synchronization state (described below) or upon exit therefrom. The exhausted guess register 318 is used (i.e., not reset) when the synchronization mechanism is in the slip state (i.e., seeking synchronization). Exiting the synchronization state necessitates execution of the sync acquisition method from scratch. The exhausted guess register may also be cleared when all of its bits are set and synchronization has not been achieved.

The number of bits by which the variable rotator 308 rotates its input is controlled by a rotation controller 328. Upon generating a guess, the state guess block 306 indicates to the rotation controller 328 the state that was guessed. The rotation controller 328 determines the number of bit positions by which the variable rotator 308 is to rotate the 128-bit segment at its input. FIG. 4 provides a table which indicates the rotate amount for each state. The variable rotator 308 takes the bit stream segment at its input and rotates it forward (i.e., to the left, as written) by the rotate amount indicated in the table of FIG. 4. If, for example, the bits D(0)-D(127) are at the input of the variable rotator 308 and the rotate amount is 56, the output of the variable rotator, upon completion of the rotation, will be D(56)-D(127), D(0)-D(55).

The variable rotator 308 in conjunction with the state guess block 306 attempt to rotate the two-bit sync headers (ss), wherever they may be in the incoming bit stream, into fixed positions at the output of the variable rotator; in this embodiment, bit positions 0, 1 and 66, 67. Because the sync headers shift by four bits with each cycle (see FIG. 2), the rotate amount is incremented every cycle by four to maintain the sync headers at the desired bit positions at the output of the rotator 308.

After the variable rotator 308 has performed the aforementioned rotation, its output is loaded into a register 309 which is 128 bits wide. The register 309 is loaded once every cycle. The contents of the register 309 at a given cycle correspond to the output of the variable rotator 308 at the previous cycle.

The output of the variable rotator 308 and the contents of the register 309 are then combined using selection logic 312 and provided to a register 314, which is 132 bits wide. The selection logic 312 selects the x most significant bits (MSBs) at the output of the rotator 308 and the 132-x least significant bits (LSBs) of the register 309, where x is equal to the rotate amount as determined by the rotate controller 328. As such, bit positions 0 through 131-x of register 314 correspond to the 132-x LSBs of register 309 and the remaining, higher order bits of register 314 correspond to the x MSBs of the output of the variable rotator 308.

This operation of combining the outputs of the variable rotator 308 and the register 309 to form the 132-bit contents of register 314 is illustrated in the table of FIG. 4. Note from FIG. 4 that there is a special case for the first state, in which the rotate amount is zero. When the input state is as shown, that cycle is treated as an idle cycle and the contents of register 314 are not updated. This is due to the fact that the incoming bit stream is processed at the input of the apparatus 300 in 128-bit segments and output from the apparatus in 132-bit segments. The total number of bits in 33 128-bit segments is the same as that for 32 132-bit segments. As such, the 33 possible states at the input of the apparatus 300 will be processed into 32 states at the output of the apparatus 300.

As a result of the above operations, if the state guessed by the state guess block 306 is correct, there will be sync headers at bit positions 0, 1 and 66, 67 of register 314. These bit positions are monitored by a sync header test block 310 which determines if they contain proper sync headers. The sync header test block 310 is coupled to a valid frame counter 315 and an invalid frame counter 316. If both sync headers are correct, i.e., if the sync header test block 310 determines that the bits 0, 1 and 66, 67 of register 314 have the proper values (i.e., 0101 or 1010) for a given cycle, the valid frame counter 315 is incremented by two for that cycle. If both sync headers are incorrect, i.e., if the sync header test block 310 determines that the bits 0, 1 and 66, 67 of register 314 do not have the proper values (0101/1010), the invalid frame counter 316 is incremented by two for that cycle. If one of the headers in register 314 is correct and the other is incorrect, both the valid frame counter 315 and the invalid frame counter 316 are incremented by one.

The counters 315 and 316 are reset whenever the system changes states (i.e., from in synchronization to out of synchronization or the reverse).

The contents of the counters 315 and 316 are provided to a PCS state machine 320 which keeps track of and manages the state of the synchronization mechanism. The PCS state machine 320 determines when the system is in a state of synchronization, when it is out of synchronization, and when to enter the "slip" state. The other elements of the apparatus 300 operate accordingly.

As each guess by the state guess block 306 is implemented, the PCS state machine 320 qualifies each guess over 64 frames of the incoming bit stream data. If there are 64 consecutive valid frames, i.e., if the valid counter 315 has a count of 64, the system is deemed to be in synchronization (i.e., the current guess is correct). The PCS state machine 320 transitions to the synchronized state and asserts the IN_SYNC signal.

If, however, the guess made by the state guess block 306 is incorrect, the invalid frame counter 316 will eventually reach 16, in which case the PCS state machine 320 transitions to the unsynchronized state and asserts the OUT_SYNC signal. All parameters including the contents of the counters 315 and 316 and of the exhaust register 318 are cleared and the above-described synchronization acquisition process is repeated, starting with a new guess by the state guess block 306.

The above-described odd/even state toggling mechanism (301, 302, 305) allows the system to quickly transition between the even and odd states illustrated in the table of FIG. 2. If the PCS State Machine 320 determines that the system is not in synchronization using the current guess, the ODD/EVEN selection signal is toggled and the state guess block 306 makes a new guess from the set of (even or odd) states. In this way, the system alternately considers the odd and even states in the process of acquiring synchronization.

A counter 322 keeps track of the number of frames that have been processed since the last change of state of the PCS State Machine 320.

Further, as an additional test of synchronization, the bit error rate is monitored over 125 μs and constant above par errors, even if they are not enough to lose synchronization will trigger a high bit error rate test and take the synchronizer out of sync. A bit error rate (BER) block 324 is included in the exemplary embodiment for this purpose.

It is to be understood that while the invention has been described above in conjunction with preferred specific embodiments, the description is intended to illustrate and not to limit the scope of the invention, as defined by the appended claims. Indeed, various modifications of the invention in addition to those described herein will become apparent to those skilled in the art from the foregoing description and the accompanying figures. Such modifications are intended to fall within the scope of the appended claims.

It is further to be understood that all values are to some degree approximate, and are provided for purposes of description.

The disclosures of any patents, patent applications, and publications that may be cited throughout this application are incorporated herein by reference in their entireties.

What is claimed is:

1. A device for determining the frame boundaries of serialized framed data, the device comprising:
    a serial to parallel converter for converting the serialized framed data to a parallel framed data;
    a first register for receiving the parallel framed data from the serial to parallel converter and outputting a first output data word of the parallel framed data at a current cycle clock;
    a second register for receiving the first output data word, and outputting a second output data word corresponding to a previous first output data word from the first register of a previous cycle clock;
    a selector having a first port coupled to the second output data word, a second port coupled to a concatenated data word, and a third port configured to select the second output data word or the concatenated data word, wherein the concatenated data word is a concatenation of a portion of the first output data word and a portion of the second output data word;
    a guesser for guessing a position of a frame boundary in the output data word selected by the selector;
    a rotator for rotating the selected data word in accordance with the position guessed by the guesser;
    a third register for storing a previous version of the rotated data word;
    a select logic unit for combining a portion of the data word held in the rotator and a portion of data word held in the third register to form a data output block comprising two or more synchronization patterns;
    a fourth register for storing the data output block;
    a tester coupled to the fourth register for simultaneously monitoring the two or more synchronization patterns in the data output block;
    a counting mechanism coupled to the tester and being configured to count the number of valid and invalid synchronization patterns; and
    a state machine determining if the device is in a state of synchronization based on the counting mechanism, wherein said state machine is coupled to the third port of the selector and alternately provides the second output data word or the concatenated data word to the guesser and the rotator.

2. The device of claim 1 further comprising:
    an exhaust register, the exhaust register storing one or more positions guessed by the guesser determined not to contain a frame boundary at a position guessed by the guesser.

3. The device of claim 2, wherein the guesser excludes the one or more positions stored in the exhaust register as possible positions of the frame boundary.

4. The device of claim 1 wherein the portion of the first output data word comprises first arriving serial bits of the parallel framed data at the current cycle clock and the portion of the second output data word comprises bits of the previous first output data word from the first register at the previous cycle clock starting at an offset of an odd number of bits from the first arriving bits.

5. The device of claim 4, wherein the odd number of bits is one.

6. The device of claim 1, wherein the serialized framed data comprises a plurality of frames, each frame comprising comprises a data field and a synchronization pattern.

7. The device of claim 6, wherein the data field comprises 64 bits and the synchronization pattern comprises two bits.

8. The device of claim 1, wherein the serialized framed data is 10 Gb Ethernet data.

9. The device of claim 1, wherein the counting mechanism comprises:
    a first counter for counting the number of valid synchronization patterns in the data output block; and
    a second counter for counting the number of invalid synchronization patterns in the data output block.

10. The device of claim 1, wherein the state machine resets the first and second counters when the state machine determines a change in the state of synchronization.

11. The device of claim 1, wherein the state of synchronization is obtained when the state machine detects a predetermined number of consecutive valid synchronization patterns in the serialized framed data.

12. The device of claim 1, wherein the first and second output data words are an integer multiple of eight (8) bits.

13. The device of claim 10, wherein the width (or length) of the fourth register is greater than the width (or length) of the first, second, or third register.

* * * * *